No. 848,595. PATENTED MAR. 26, 1907.
P. MANDEVILLE & W. C. WALKER.
METHOD OF REGULATING THE TEMPERATURE OF AIR.
APPLICATION FILED MAY 19, 1906.
2 SHEETS—SHEET 1.
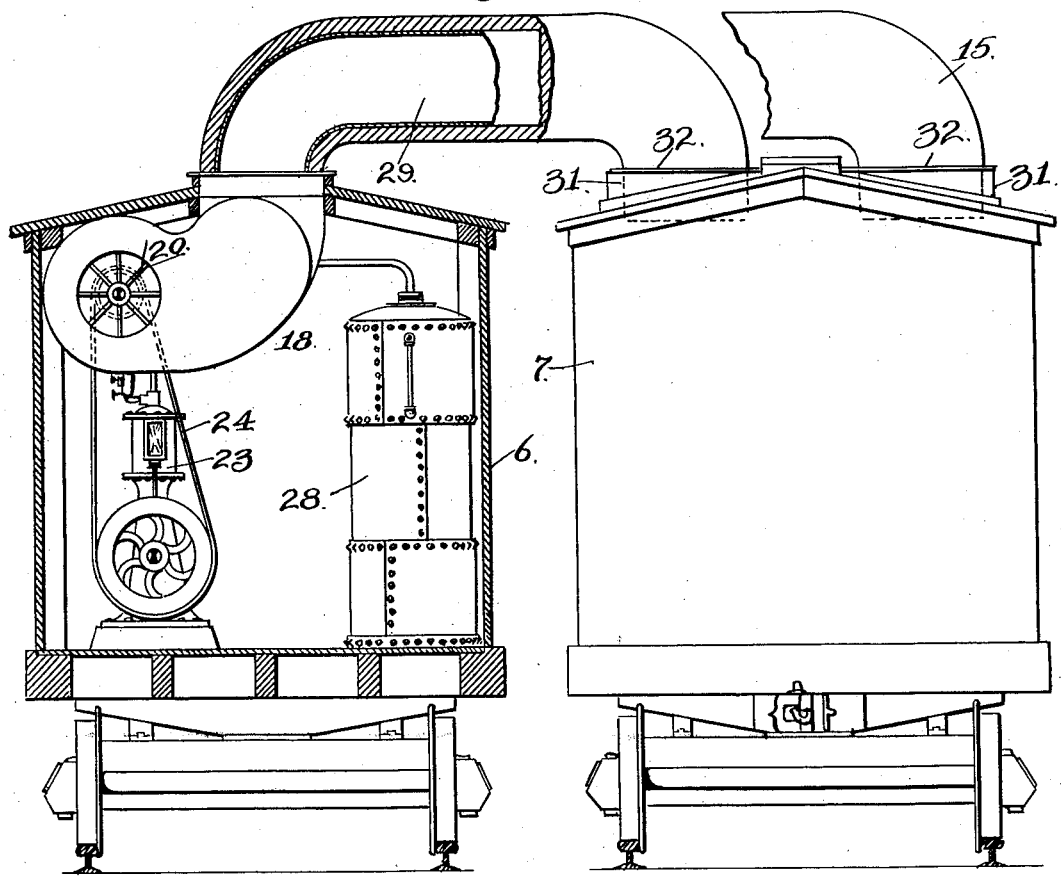
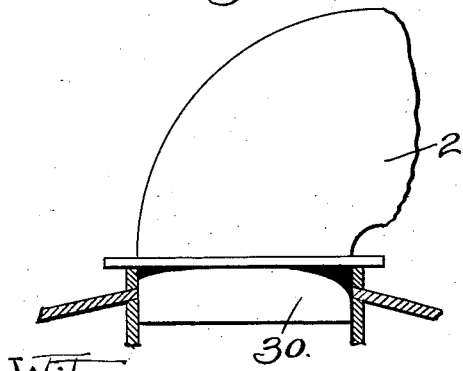
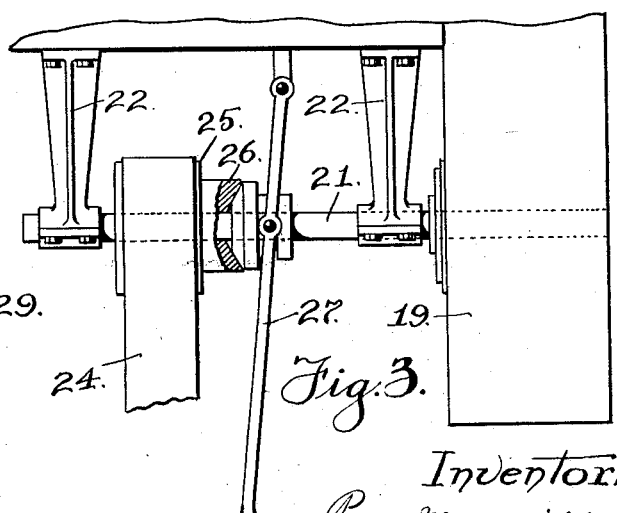
Witnesses.
Arthur L. Slee.
J. B. Weir
Inventors
Paul Mandeville,
William C. Walker,
by Bond Adams and Pickard Jackson
their Attys.

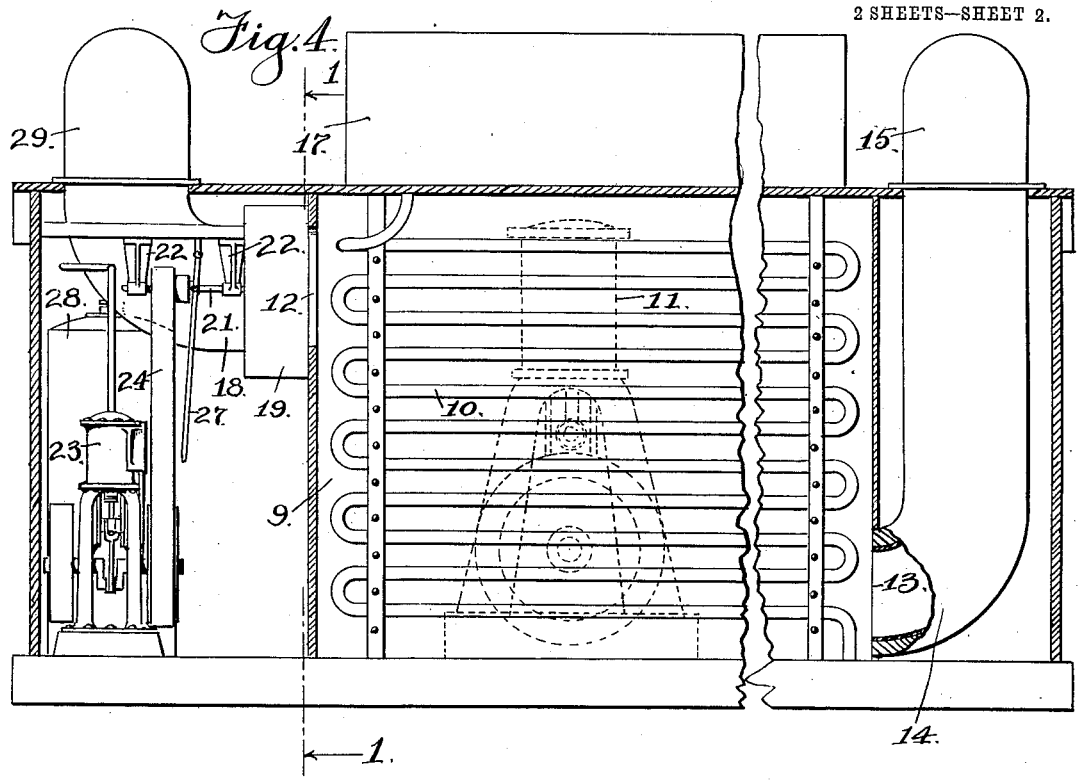

UNITED STATES PATENT OFFICE.

PAUL MANDEVILLE AND WILLIAM C. WALKER, OF CHICAGO, ILLINOIS; SAID MANDEVILLE ASSIGNOR TO CHARLES E. MANDEVILLE, OF CHICAGO, ILLINOIS.

METHOD OF REGULATING THE TEMPERATURE OF AIR.

No. 848,595.            Specification of Letters Patent.            Patented March 26, 1907.

Application filed May 19, 1906. Serial No. 317,824.

*To all whom it may concern:*

Be it known that we, PAUL MANDEVILLE and WILLIAM C. WALKER, citizens of the United States, and residing at Chicago, in the county of Cook, State of Illinois, have invented a certain new and Improved Method of Regulating the Temperature of Air, of which the following is a specification.

Our invention relates to the regulation of the temperature of air, particularly in connection with the preservation of perishable matter, such as fruit, eggs, meat, &c.

In transporting perishable articles great distances—as, for instance, bringing fruit from California to eastern markets—for many years it was necessary to pick the fruit green, owing to the rapid ripening of the fruit in transit, with the result that there was considerable loss through the failure of the fruit to properly mature on the trees, as well as because the fruit so ripened did not possess as good a flavor as that ripened on the trees. With the object of avoiding the objections mentioned, as well as others incident to the older methods of handling the fruit, many efforts have been made to improve the conditions under which the fruit is transported, particularly by what is called "precooling" of the refrigerator-cars in which the fruit is carried. It has been well established that if the temperature of the car can be properly reduced immediately after the fruit has been packed in it, so that the warm air contained in the fruit-packages is brought to a uniform temperature with the rest of the car, the fruit will be preserved much more perfectly, as experience has shown that practically all the deterioration of the fruit in transit occurs during the first three days of the trip, due to the fact that the warm air in the fruit-packages raises and sustains the temperature of the car and promotes decay.

Heretofore it has been attempted to equalize the temperature of the air in all parts of the car, including that contained in the fruit-packages, by instituting a forced circulation of cooled air through the car, the air being taken from the car through suitable conduits and after being conducted over refrigerating-coils being returned to the car at the opposite end, so that the car itself formed part of a circulatory system, which included the refrigerating apparatus. In some instances, the air has been caused to pass over ice placed in suitable receptacles in the car, which have been used in lieu of the refrigerating-coils. This system, while an improvement over the older practice, has not been as successful as was anticipated, for the reason that the air circulating through the car naturally takes the path of least resistance, which is in the upper part of the car and around the fruit-packages, and consequently the air that is occupying the space within the fruit-packages has not been sufficiently affected. To meet the deficiencies of this circulatory system, it has been proposed to create a partial vacuum in the car at intervals, on the theory that by so doing the air in the car will be rarefied, causing the air in the fruit-packages to expand and in that way be partly expelled from them. By alternately producing a partial vacuum and maintaining a circulation through the car the theory has been that the air leaving the fruit-packages during the interval of the partial vacuum will be brought into contact with the air in the body of the car, while the cold air entering the car at the end of the partial-vacuum interval will be caused to mingle with the air in the fruit-packages, owing to the increase in the density of the air, caused by the restoration of circulation. This method also has not been entirely successful, for the reason that the establishment of any adequate partial vacuum in the car has the effect of sucking into the car through the numerous cracks and interstices of the car-frame a considerable quantity of warm air from the outside, with the result that if a partial vacuum be maintained for even a very short time the temperature of the car is increased to a considerable extent, particularly so if the temperature of the outer air is high. Moreover, the displacement of the air in the fruit-packages and the cooling of it by the intermittent vacuum method referred to is slow, incomplete, and wasteful, as a large amount of cold air is drawn from the car and exhausted into the atmosphere.

We have discovered, however, that the objections experienced in the methods heretofore employed may be avoided and very satisfactory results secured by utilizing the principle of convection, the air in the fruit-packages being displaced by colder air introduced into the car in any suitable way, as by connecting the car with means for establishing a circulation of cold air therethrough. In carrying into effect this principle we provide for intermittently introducing cold air into the car and causing it to circulate therethrough, the circulation of the air being stopped at intervals, so that the air in the car may be permitted to diffuse itself naturally by reason of the difference of temperature of the air in the different parts of the car.

During the interval of admission of the cold air the car, and particularly the upper portion thereof, is thoroughly cooled, but, as has been suggested, the air circulating through the car does not properly penetrate the fruit-packages. During the interval of rest, however, the cold air in the upper portion of the car immediately falls, displacing the warm air in the lower portion of the car and in the fruit-packages, causing it to rise to the upper portion of the car. By then restoring the circulation of cold air through the car the warm air is carried out and cooled, the whole operation being accomplished without drawing atmospheric air into the car or wasting cold air by exhausting it into the atmosphere. Moreover, the air in the fruit-packages is practically all displaced by the colder air at each of the intervals of rest, so that the fruit itself is thoroughly cooled in a very short time.

In practice we have found that very satisfactory results are secured by maintaining a full circulation of cold air for an interval of about thirty seconds, then maintaining a reduced circulation for about ten seconds, followed by an interval of rest for about ten seconds. After the interval of rest a reduced circulation is again maintained for ten seconds, preliminary to the next period of maintaining full circulation for thirty seconds. These intervals may, however, be varied, as the proper apportionment of the time and the rapidity of the flow of the air should be varied according to the nature of the products to be transported. Some fruits require treatment for only a short time, while others require a longer time, and the same is true of vegetables, eggs, &c. Meats require treatment for a very much longer time than fruits, as they cannot be so quickly brought to the desired low temperature.

So far as we are aware no one has heretofore contemplated securing the diffusion of cold air throughout a car or other receptacle containing perishable material by natural diffusion in connection with the establishment intermittently of a circulation of air as described. We therefore claim our improved method broadly. It should be understood, moreover, that while we have described our improved method as applied to the cooling of air it is equally applicable in cases where the air is to be warmed and can also be applied in any other situation where it is desirable to equalize the temperature of a body of air the free circulation of a portion of which is impeded to a greater or less extent. It may also be employed to control the humidity or density of a confined body of air or gas, to regulate the precipitation of moisture or the separation of gases, or for any other purpose to which it is adapted.

The accompanying drawings illustrate forms of apparatus which may be employed in practicing our improved method; but such apparatus is not herein claimed, as it will form the subject-matter of a separate application.

In said drawings, Figure 1 is an end view illustrating two cars, one of which is in section, showing one manner of carrying out our improved process. Fig. 2 is a detail of one of the connecting-conduits. Fig. 3 is a detail illustrating the clutch mechanism by which the fan is controlled. Fig. 4 is a partial longitudinal section of one form of work-car, and Fig. 5 is a side view of a fruit-car which may be used.

Referring to the drawings, 6 indicates the work-car, and 7 the fruit-car. The fruit-car may be one provided with ice-bunkers, as indicated by dotted lines at 8 in Fig. 5, or such bunkers may be omitted and other means provided for cooling the air which is caused to circulate through the car. Where the ice-bunkers are provided, other refrigerating mechanism is not necessary, and in that case the circulation of the air may be effected by the use of the mechanism hereinafter described or any other suitable mechanism without employing the refrigerating apparatus which has been illustrated. It will be understood, however, that for the purpose of making clear the manner in which we practice our method we have illustrated a complete apparatus by which air at the proper temperature may be caused to circulate through the fruit-cars whether ice-bunkers are employed or not.

As illustrated in Figs. 1 and 4, the work-car 6 is provided with a compartment 9, which is adapted to contain a series of refrigerating-coils 10, suitably connected with a compressor 11 in the manner common to refrigerating apparatus. The compartment 9 is preferably arranged between the ends of the car and at one side thereof, so that the compressor 11 may be placed intermediately of the car at one side of said compartment, as shown in Fig. 4. 12 indicates an inlet-opening, which is arranged near the upper portion of the compartment 9, and 13 an outlet near the bottom of the opposite end of said compartment. The latter opening opens into a duct or conduit 14, which communicates with an adjustable conduit 15 at the roof of the car. Said conduit 15 is adapted to be connected with the fruit-car, as will hereinafter appear. 17 indicates a condenser, which is preferably placed on the roof of the car and is connected with the coil 10 in the usual way. 18 indicates a conduit which communicates with the inlet-opening 12. Said conduit is provided with a fan-chamber 19, in which a blower of any suitable construction is placed for causing the air to circulate through the various conduits, chambers, and fruit-cars. The fan is illustrated at 20 in Fig. 1 and is mounted on a shaft 21, suitably supported, preferably by hangers 22. It is driven in any suitable way, as by an engine 23, which drives the shaft 21 through a belt 24 or by any other suitable means. The belt 24 runs over a pulley 25, which is loosely mounted on the shaft 21 and is adapted to be connected thereto by a friction-clutch 26 or any other suitable means for transmitting power to the shaft 21 and permitting variation in speed of said shaft, so that the fan may be slowed down or stopped, as desired. Where the clutch 26 is employed, it may be operated by a lever 27, as illustrated in Fig. 3. 28 indicates a boiler for supplying steam to the engine 23.

As shown in Fig. 1, the conduit 18 communicates through the roof of the car with a conduit 29, which is adapted to be swung into and out of operative connection with a fruit-car placed on a parallel track, as shown. Said conduit has a bearing in the roof of the work-car, as shown at 30 in Fig. 2, so that it may be swung toward and from the fruit-car and may also be raised and lowered, so as to move into and out of operative connection with the fruit-car, the projecting portion 30 of the conduits being telescoped in its bearing, as shown in Fig. 2. The conduit 15 at the opposite end of the car is similar to conduit 29. In order to provide a tight connection between the conduits 29 and 15 and the fruit-car and compensate for the slope of the roof of the car, we employ pads or cushions 31, which are wedge-shaped, their upper surfaces being horizontal when placed on the roof of the car, as shown in Fig. 1, and the conduits 29 and 15 are provided with flanges 32, which rest on said pads when the conduits are in position, as shown, thus providing substantially tight connections. The apparatus is operated as hereinbefore described, the fan being slowed down or stopped, as necessary, by operating the lever 27. Where the fruit-cars are provided with the ice-bunkers, the course of the air is not altered, but the compressor is not operated. The compressor may receive steam from the boiler 28 or may be operated in any other suitable way.

We wish it to be understood that any suitable apparatus for the purpose may be employed in practicing our improved method, also that although we have described our process as applied to railway-cars it may be applied to any other suitable chamber or receptacle, such as a warehouse, a vessel, &c.

What we claim as our invention, and desire to secure by Letters Patent, is—

1. The method of regulating the temperature of air in a chamber, which consists in displacing by convection a part of the air in said chamber with air introduced thereinto at a different temperature, and then directing a current of air through said chamber.

2. The method of regulating the temperature of air in a chamber, which consists in directing a current of air at a different temperature through said chamber at intervals, and permitting the air therein to diffuse by convection.

3. The method of regulating the temperature of air in a chamber, which consists in introducing cool air into said chamber, permitting the air so introduced to diffuse therein by convection, and then causing a circulation of air through said chamber.

4. The method of regulating the temperature of air in a chamber, which consists in establishing a circulation of cool air through said chamber, permitting the air so introduced to diffuse therein by convection, and then again establishing a circulation of cool air through said chamber.

5. The method of regulating the temperature of air in a chamber, which consists in introducing into said chamber air at a temperature different from that in said chamber permitting it to diffuse therein by convection and then causing a circulation of air through said chamber.

6. The method of regulating the condition of air in a chamber, which consists in displacing by convection a part of the air in said chamber with air of different density introduced thereinto and then directing a current of air through said chamber.

7. The method of regulating the condition of air in a chamber, which consists in alternately introducing air into said chamber and permitting it to diffuse therein by convection the air introduced being of a different density from the air contained in said chamber.

8. The method of regulating the condition of air in a chamber, which consists in displacing by convection a part of the air in said chamber with air of different humidity introduced thereinto and then directing a current of air through said chamber.

9. The method of regulating the condition of air in a chamber, which consists in alternately introducing air into said chamber and permitting it to diffuse therein by convection, the air introduced being of a different humidity from the air contained in said chamber.

PAUL MANDEVILLE.
WILLIAM C. WALKER.

Witnesses:
   JOHN L. JACKSON,
   WILLIAM H. DE BUSK.